US010116464B2

(12) United States Patent
Lin et al.

(10) Patent No.: US 10,116,464 B2
(45) Date of Patent: Oct. 30, 2018

(54) EVPN INTER-SUBNET MULTICAST FORWARDING

(71) Applicant: Juniper Networks, Inc., Sunnyvale, CA (US)

(72) Inventors: Wen Lin, Andover, MA (US); John E. Drake, Pittsburgh, PA (US); Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 287 days.

(21) Appl. No.: 14/675,202

(22) Filed: Mar. 31, 2015

(65) Prior Publication Data

US 2016/0277210 A1 Sep. 22, 2016

Related U.S. Application Data

(60) Provisional application No. 62/135,023, filed on Mar. 18, 2015.

(51) Int. Cl.
*H04L 12/46* (2006.01)
*H04L 12/18* (2006.01)
*H04L 12/761* (2013.01)
*H04L 12/721* (2013.01)

(52) U.S. Cl.
CPC ...... *H04L 12/4625* (2013.01); *H04L 12/1886* (2013.01); *H04L 12/4641* (2013.01); *H04L 45/16* (2013.01); *H04L 45/66* (2013.01)

(58) Field of Classification Search
CPC .... H04L 12/4625; H04L 12/886; H04L 45/66
See application file for complete search history.

(56) References Cited

U.S. PATENT DOCUMENTS

| 8,125,926 B1 | 2/2012 | Kompella |
| 2015/0030031 A1* | 1/2015 | Zhou ............... H04L 12/4625 |
| | | 370/395.53 |

OTHER PUBLICATIONS

E-VPN and IP-VPN Integrated Solution by Sajaasi , Oct. 21, 2013.*
Lin et al., "EVPN Inter-Subnet Multicast Forwarding," Internet Draft, draft-Lin-bess-evpn-irb-mcast.txt, Dec. 26, 2014, 8 pages.

(Continued)

*Primary Examiner* — Robert M Morlan
*Assistant Examiner* — Pamit Kaur
(74) *Attorney, Agent, or Firm* — Shumaker & Sieffert, P.A.

(57) ABSTRACT

The techniques of this disclosure may improve multicast forwarding in an Ethernet Virtual Private Network when delivering multicast traffic to receivers on a different IP subnet than the multicast source. A method may include configuring first and second layer-2 domains to forward network traffic; configuring a first layer-3 Integrated Routing and Bridging (IRB) interface for the first layer-2 domain and a second layer-3 IRB interface for the second layer 2 domain; receiving a multicast packet from a multicast source device, the multicast source device being included in the first layer-2 domain, the multicast packet having a multicast receiver device in the second layer-2 domain; and forwarding, using the first and second layer-3 IRB interfaces, the multicast packet to the multicast receiver device, without receiving the multicast packet from another provider edge router that has been elected as the designated router on the second IRB interface for the second layer-2 domain.

20 Claims, 6 Drawing Sheets

(56) References Cited

OTHER PUBLICATIONS

Lin et al., "EVPN Inter-Subnet Multicast Forwarding," Internet Draft, draft-Lin-bess-evpn-irb-mcast-00.txt, Apr. 3, 2015, 8 pp.

Sajassi et al., "E-VPN and IP-VPN Integrated Solution," L2VPN Workgroup Internet Draft, draft-sajassi-L2vpn-evpn-ipvpn-interop-02, Oct. 21, 2013, 16 pp.

Extended Search Report from counterpart European Application No. 16159931.1, dated Jul. 22, 2016, 13 pp.

Rosen, et al., "BGP/MPLS IP Virtual Private Networks (VPNs)," retrieved from https://tools.ietf.org/html/rf4364, RFC 4364, Feb. 2006, 47 pp.

Fenner, et al., Protocol Independent Multicast-Sparse Mode (PIM-SM), RFC 4601, Aug. 2006, https://tools.ietf.org/html/rfc4601, 112 pp.

Sajassi, et al., "BGP MPLS-Based Ethernet VPN," Feb. 2015, RFC 7432 https://tools.ietf.org/html/rfc7432, 56 pp.

Sajassi, et al., "Integrated Routing and Bridging in EVPN," Nov. 11, 2014, https://tools.ietf.org/html/draft-ietf-bess-evpn-inter-subnet-forwarding-00, 26 pp.

Yong, et al., "Network Virtualization Edge," retrieved Feb. 13, 2014, from https://tools.ietf.org/html/draft-yong-nv03-nve-03, 20 pp.

Response to Communication pursuant to Rule 69 EPC dated Sep. 26, 2016, from counterpart European Application No. 16159931.1, filed on Mar. 21, 2017, 36 pp.

Communication pursuant to Article 94(3) EPC dated Oct. 13, 2017 in counterpart EP Application No. 16159931.1, 7 pps.

Response to Communication dated Oct. 13, 2017, from counterpart European Patent Application No. 16159931.1, filed on Feb. 14, 2018, 17 pp.

Communication pursuant to Article 94(3) EPC dated Jul. 3, 2018 received in counterpart EP application No. 16159931.1, 10 pp.

\* cited by examiner

EVPN INTER-SUBNET MULTICAST FORWARDING

This application claims the benefit of U.S. Provisional Application No. 62/135,023, filed Mar. 18, 2015, the entire content of which is incorporated herein by reference.

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) network devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

A computer network may be configured to support multicast traffic over EVPN. Multicast traffic may include Internet Protocol Television (IPTV), desktop conferences, corporate broadcasts, music and video web casts, and other forms of multimedia content. The computer network may utilize protocol independent multicast (PIM) as a multicast routing protocol to control delivery of multicast traffic from sources to receivers or subscriber devices for particular multicast groups. PIM may operate in several different modes, including Dense Mode (DM), Sparse Mode (SM), Source-Specific Mode (SSM), and Bidirectional Mode (BIDIR).

In some environments, PIM and other multicast routing protocols are used to control delivery of multicast traffic within shared media networks (e.g., local area networks) (LANs), such as Ethernet networks. Unlike point-to-point transit links, shared media networks can introduce several complications to multicast communications, such as duplicate copies of multicast traffic appearing on the LAN by multiple upstream routers. PIM seeks to address these issues by performing an election of a single router for forwarding the multicast traffic. That is, a single router is elected to forward multicast traffic to a shared media LAN, thereby seeking to prevent duplicate data packets from appearing on the LAN from different routers. However, electing a single router to forward multicast traffic may also introduce complications into a network.

SUMMARY

The techniques described herein may improve inter-subnet multicast forwarding in an EVPN when delivering multicast traffic to receivers on a different IP subnet than the multicast source. For instance, one or more provider edge routers (PEs) of an EVPN that are running PIM may forward multicast traffic between multicast receivers and multicast sources. In some instances, a multicast receiver may be configured on a different layer-2 domain than the multicast source. To perform inter-subnet multicast forwarding from one layer-2 domain to another, a particular PE is configured as the PIM designated router (PIM-DR) for a particular layer-2 domain. In accordance with techniques of the disclosure, rather than only permitting the PIM-DR to bridge multicast traffic from one layer-2 domain to another, each PE in the EVPN running PIM may be configured to perform inter-subnet multicast forwarding locally from one layer-2 domain to another. For example, each PE in the EVPN may use one or more Integrated Routing and Bridging (IRB) interfaces to bridge multicast traffic from one layer-2 domain to another. In this way, a PE that receives multicast traffic from a locally-attached multicast source in a first layer-2 domain may forward the multicast traffic directly to a locally-attached multicast receiver in a second layer-2 domain. As such, techniques of the disclosure may reduce or prevent a "hair-pinning effect" that would otherwise occur from only permitting forwarding multicast traffic from a first L3 subnet to a second L3 subnet at the PIM-DR. Accordingly, techniques of the disclosure may permit a PE to forward multicast traffic for multicast receivers from a first L3 subnet to a second L3 subnet regardless of the DR role for the PE that forwards the multicast traffic.

In some examples, a method includes configuring, by a provider edge router, first and second layer-2 domains to forward network traffic; configuring, by the provider edge router, a first layer-3 Integrated Routing and Bridging (IRB) interface for the first layer-2 domain and a second layer-3 IRB interface for the second layer 2 domain; receiving, by the provider edge router, a multicast packet from a multicast source device, the multicast source device being included in the first layer-2 domain, the multicast packet having a multicast receiver device in the second layer-2 domain; and forwarding, by the provider edge router and using the first and second layer-3 IRB interfaces, the multicast packet to the multicast receiver device, without receiving the multicast packet from another provider edge router that has been elected as the designated router on the second IRB interface for the second layer-2 domain.

In some examples, a provider edge router includes: at least one processor; and at least one module, operable by the at least one processor to: configure first and second layer-2 domains to forward network traffic; configure a first layer-3 Integrated Routing and Bridging (IRB) interface for the first layer-2 domain and a second layer-3 IRB interface for the second layer 2 domain; receive a multicast packet from a multicast source device, the multicast source device being included in the first layer-2 domain, the multicast packet having a multicast receiver device in the second layer-2 domain; and at least one forwarding unit operable to: forward, using the first and second layer-3 IRB interfaces, the multicast packet to the multicast receiver device, without receiving the multicast packet from another provider edge router that has been elected as the designated router on the second IRB interface for the second layer-2 domain.

In some examples, a non-transitory computer-readable storage medium is encoded with instructions that, when executed, cause at least one processor of a provider edge router to: configure first and second layer-2 domains to forward network traffic; configure a first layer-3 Integrated Routing and Bridging (IRB) interface for the first layer-2 domain and a second layer-3 IRB interface for the second layer 2 domain; receive a multicast packet from a multicast source device, the multicast source device being included in the first layer-2 domain, the multicast packet having a multicast receiver device in the second layer-2 domain; and forward, using the first and second layer-3 IRB interfaces, the multicast packet to the multicast receiver device, without receiving the multicast packet from another provider edge router that has been elected as the designated router on the second IRB interface for the second layer-2 domain.

The details of one or more embodiments are set forth in the accompanying drawings and the description below. Other features, objects, and advantages will be apparent from the description and drawings, and from the claims.

DETAILED DESCRIPTION

Figure 1:
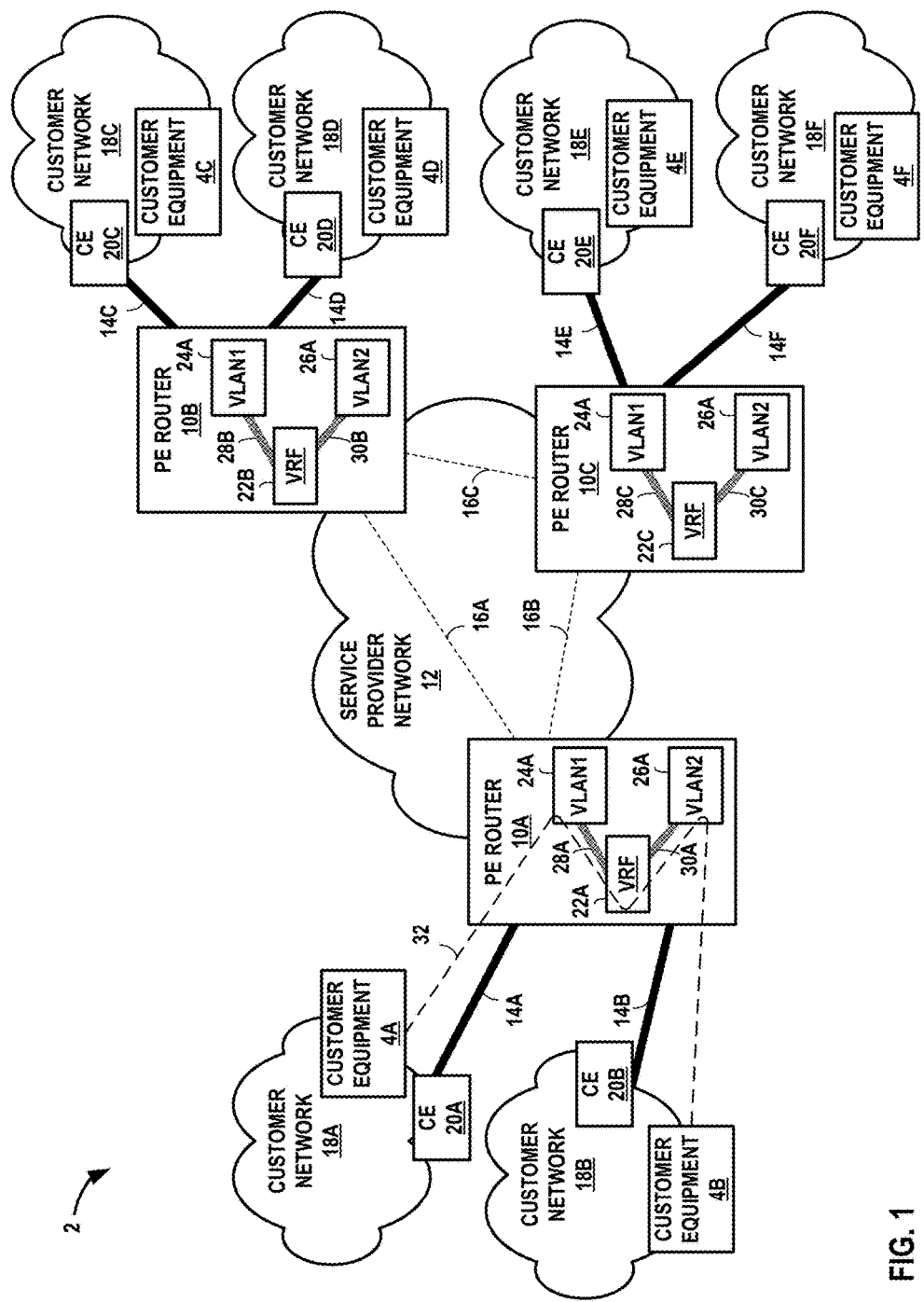
FIG. 1 is a block diagram illustrating an example system comprising a network device that implements techniques to improve inter-subnet multicast forwarding in an EVPN when delivering multicast traffic to receivers on different IP subnet, in accordance with techniques of the disclosure.

FIG. 1 is a block diagram illustrating an example system 2 comprising a network device that implements techniques to improve inter-subnet multicast forwarding in an EVPN when delivering multicast traffic to receivers on different IP subnet, in accordance with techniques of the disclosure. In the example of FIG. 1, PE routers 10A-10C ("PEs 10") provide customer equipment 4A-4F ("customer devices 4") associated with customer networks 18A-18F ("customer networks 18") with access to service provider network 12 via attachment circuits 14A-14F ("attachment circuits 14"). PEs 10 couple to customer edge routers 20A-20F ("CEs 20") of customer networks 14 via attachment circuits 14. Each of ACs 14 is a physical or virtual circuit attaching a CEs 20 to one of PEs 16 and may be, for example, an Ethernet port and/or VLAN. Attachment circuits 14 may each comprise a direct link or an access network.

PEs 10 and CEs 20 are illustrated as routers in the example of FIG. 1; however, techniques of the disclosure may be implemented using switches or other suitable network devices. Customer networks 18 may be networks for geographically separated sites of an enterprise. Each of customer networks 18 may include additional customer equipment 4A-4F ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of system 2 illustrated in FIG. 1 is merely exemplary. For example, an enterprise may include any number of customer networks 18. Nonetheless, for ease of description, only customer networks 18A-18F are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 18 may be viewed as edge networks of the Internet. Service provider network 12 may provide computing devices within customer networks 18 with access to the Internet, and may allow the computing devices within the customer networks to communicate with each other. Service provider network 12 may include a variety of network devices other than PEs 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of attachment circuits 14 and/or logical links 16A-16C, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes Ethernet Virtual Private Network (EVPN). EVPN is a service that provides a form of L2 connectivity across an intermediate network, such as service provider network 12, to interconnect two L2 customer networks, such as L2 customer networks 18, that are usually located in two different geographic areas. Often, EVPN is transparent to the customer networks in that these customer networks are not aware of the intervening intermediate service provider network and instead act and operate as if these two customer networks were directly connected. In a way, EVPN enables a form of transparent LAN connection between two geographically distant customer sites that each operates a L2 network and, for this reason, EVPN may also be referred to as a "transparent LAN service."

To configure EVPN, LSPs may be configured such that each of PEs 10 that provide EVPN for consumption by the subscribing entity is interconnected by way of LSPs to one or more of the other PEs that provide EVPN for consumption by the subscribing entity. In the example of FIG. 1, each of PEs provides access to the EVPN for carrying traffic associated with customer networks 18 and, therefore, each of PE devices 10 within the same Ethernet segment may be connected to every other PE device 10 via LSPs, such as logical links 16. Once LSPs are configured in this manner, EVPN may be enabled within PE devices 10 to operate over the LSPs, which may in this context operate as logical dedicated links through service provider network 12. In some examples, transporting network traffic over an EVPN may include prepending or otherwise inserting a tag and a LSP label onto incoming L2 packets, which may also be referred to as L2 frames (particularly in the context of Ethernet), and transmitting the tagged packets through a corresponding one of the configured LSPs. Once EVPN is configured within service provider network 12, customer equipment 4 within customer networks 18 may communicate with one another via EVPN as if they were directly connected L2 networks.

In the example of FIG. 1, when providing the EVPN service to customer networks 18, PEs 10 and CEs 20 typically perform MAC address learning to efficiently forward L2 network communications in system 2. That is, as PEs 10 and CEs 20 forward Ethernet frames, the routers learn L2 state information for the L2 network, including media access control (MAC) addressing information for customer equipment 4 within the network and the physical ports through which customer equipment 4 are reachable. PEs 10 and CEs 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the destination L2 address (e.g, MAC address) specified in the Ethernet frame. In this case, the router forwards a single copy of the Ethernet frame out the associated interface.

As PEs learn the MAC address for customer equipment 4 reachable through local attachment circuits, the PEs 10 utilize route advertisements of a layer three (L3) routing protocol (i.e., BGP in this example) to share the learned MAC addresses and to provide an indication that the MAC addresses are reachable through the particular PE that is issuing the route advertisement. In the EVPN implemented in system 2, each of PEs 10 advertises the locally learned MAC addresses to other PEs 10 using a BGP route advertisement, also referred to herein as a "MAC route" or a "MAC Advertisement route." As further described below, a MAC route typically specifies an individual MAC address of a customer equipment 4 along with additional forwarding information, such as a route descriptor, route target, layer 2 segment identifier, MPLS label, etc. In this way, PEs 10 use BGP to advertise and share the MAC addresses learned when forwarding layer two communications associated with the EVPN.

In this way, PEs 10 may perform both local learning and remote learning of MAC addresses. Each of PEs 10 utilizes MAC routes specifying the MAC addresses learned by other PE routers to determine how to forward L2 communications to MAC addresses that belong to customer equipment 4 connected to other PEs, i.e., to remote CEs and/or customer equipment behind CEs operatively coupled to PEs. That is, each of PEs 10 determines whether Ethernet frames can be sent directly to a particular one of the other PEs or whether to treat the Ethernet frames as so called "BUM" traffic (Broadcast, Unidentified Unicast or Multicast traffic) that is to be flooded within the EVPN based on the MAC addresses learning information received from the other PE routers.

CEs may be multi- and/or singly-homed to one or more of PEs 10. In FIG. 1, each of CEs 10 is singly-homed to a respective one of PEs 10. In EVPN, CE may be said to be multi-homed when it is coupled to two or more physically different PEs on the same EVI when the PEs are resident on the same physical Ethernet Segment. Multi-homed networks are often employed by network operators so as to improve access to EVPN provided by service provider network 12 should a failure in one of the multi-homing links between a CE and the respective PEs to which the CE is coupled.

As shown in FIG. 1, CE router 20A is singly-homed to PE 10A by an Ethernet link that constitutes an "Ethernet segment." In the case of a CE that is multi-homed to multiple PE routers, each Ethernet link between the CE and the multiple PEs may be included in a uniquely identifiable Ethernet Segment. Ethernet segments have an identifier, called the "Ethernet Segment Identifier" (ESI), which may be encoded as a ten octets integer. In general, an Ethernet segment uses a non-reserved ESI that is unique network wide (e.g., across all EVPNs on all the PEs). In some examples, a network operator may manage ESIs throughout the EVPN to ensure unique network wide ESIs for respective Ethernet segments. In other examples, ESIs may be allocated automatically. In this example of FIG. 1, an Ethernet segment that includes PE 10A and CE 20A may be associated with a unique ESI.

Using ESIs, PEs 10 may share learned MAC addresses by sending MAC Advertisement routes that specify, among other information, a learned MAC address and a corresponding ESI. In this way, PEs 10 may maintain tables of MAC addresses associated with corresponding ESIs. Consequently, a PE that receives and maintains MAC addresses that were previously learned by other PEs 10 can determine that a MAC route is accessible through multiple PE routers that are associated with the same ESI.

As described above, PEs 10 may use control plane signaling with different route types to provision the EVPN service in service provider network 12. EVPN defines BGP Network Layer Reachability Information (NLRI), and in particular, defines different route types. The EVPN NLRI is carried in BGP using BGP Multiprotocol Extensions. Route types include but are not limited to: Ethernet Auto-Discovery (AD) routes, MAC advertisement routes, and Ethernet Segment Routes. AD routes, for example, specify a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier.

PEs 10 and CEs 8 may share NLRI to configure one or more Ethernet segments and share MAC routes that are learned by the respective devices. In general, PEs connected to the same Ethernet segment can automatically discover each other with minimal to no configuration through the exchange of the Ethernet Segment route using BGP. In multi-homed environments EVPN defines a mechanism to signal, to remote PEs, the need to update their forwarding tables upon the occurrence of a failure in connectivity to an Ethernet segment. This is done by having each PE advertise an Ethernet AD Route per Ethernet segment for each locally attached segment which indicates the reachability of the PE in the Ethernet segment. Upon a failure in connectivity to the attached segment, the PE withdraws the corresponding Ethernet AD route by sending an AD route withdrawal message to other PEs. This triggers all PEs that receive the withdrawal to update their next-hop adjacencies for all MAC addresses associated with the Ethernet segment specified by the Ethernet AD route. If no other PEs had advertised an Ethernet AD route for the same segment, then the PE that received the withdrawal simply invalidates the MAC entries for that segment.

In some examples, one or more of PEs 10 may embed Network Virtualization Edge (NVE) functionality within the respective PEs, as described in "Network Virtualization Edge (NVE)," Feb. 13, 2014, https://tools.ietf.org/html/draft-yong-nvo3-nve-03, which is hereby incorporated by reference herein in its entirety. In some examples, a PE that implements NVE functionality may be referred to as an NVE device. As shown in FIG. 1, each of PEs 10 may implement Virtual Routing Functionality (VRF). For example, PEs 10A-10C include VRFs 22A-22C, respectively. Each of VRFs 22A-22C ("VRFs 22"), as shown in FIG. 1, logically represent an instance of Virtual Routing Functionality implemented at the respective PE. Generally, VRF permits multiple routing tables to exist within a single physical router. An attachment circuit may be associated with a particular VRF, and the particular VRF may be configured to forward traffic for the attachment circuit. VRFs 22 may be configured to include functionality described in "BGP/MPLS IP Virtual Private Networks (VPNs)," February 2006, https://tools.ietf.org/html/rfc4364, which is hereby incorporated by reference herein in its entirety.

As shown in FIG. 1, multiple Virtual Local Area Networks (VLANs) may be configured by PEs 10. Accordingly, PEs 10 may forward network packets (e.g., multicast packets) to between customer networks 18 using multiple layer 2 subnetworks. PEs 10 may be configured to implement VLANs that are identified by identifiers VLAN1 and VLAN2. As shown in FIG. 1, PEs 10A-10C may include VLAN1 instances 24A and VLAN2 instances 26A. Each instance may represent functionality implemented by the respective PE for forwarding network packets within one or more layer 2 subnetworks identified by the respective one or more VLAN identifiers.

One or more of PEs 10 may implement Integrated Routing and Bridging (IRB), which support layer-2 bridging and layer-3 routing on the same interface. As such, IRB allows a router to route local packets to another routed interface or to another bridging domain that has a layer-3 protocol configured. Accordingly, one or more IRB interfaces (or "IRBs") may be used to locally route inter-subnet traffic. For instance, using one or more IRBs, a PE may route inter-subnet traffic between VLAN1 and VLAN2. In the example of FIG. 1, PE 10A includes IRBs 28A, 30A; PE 10B includes IRBs 28B, 30B; and PE 10C includes IRBs 28C, 30C. PE 10A may route traffic between VLAN1 24A and VLAN2 26A using one or more of IRBs 28A and 30A. One or more of PEs 10 may implement IRB as described in "Integrated Routing and Bridging in EVPN", ietf-bess-evpn-inter-subnet-forwarding, Nov. 11, 2014, https://tools.ietf.org/html/draft-ietf-bess-evpn-inter-subnet-forwarding-00, which is hereby incorporated by reference herein in its entirety. IRB interfaces are L3 interfaces associated with layer-2 domains. A PE connects to layer-2 domains using L2 interfaces. With conventional PIM (L3 protocol) behavior, only the DR of a L3 interface will forward multicast traffic to local receivers; however, techniques of this disclosure allow non-DR on IRB interfaces to forward multicast traffic to local receivers, thus avoiding hair pinning.

As shown in FIG. 1, PEs 10 may be configured with one EVI, and under the single EVI there are two bridge domains with VLAN1 and VLAN2, respectively. Although not shown in FIG. 1, PEs 10 may configure two EVIs, EVI1 and EVI2, which correspond respectively to VLAN1 and VLAN2. PEs 10 share the same EVI1 and EVI2 that correspond to the two domains VLAN1 and VLAN 2. Both EVI1 and EVI2 belong to the same customer of customer networks 18, so that from a layer-3 perspective customer equipment attached to EVI1 are on VLAN 1 and customer equipment attached to EVI2 are on VLAN2.

Taking PE 10A as an example, VLAN1 and VLAN2 are connected to the same VRF 22A through IRB 28A and IRB 30A. From a layer-3 point of view, PEs 10 with NVE functionality appear connected to both VLAN1 and VLAN2 through their respective IRB interfaces. In some examples, one or more IRBs may appear to one or more PEs to be attached to the same EVI. As such, an IRB interface may appear to one or more PEs to be connected to an EVPN.

In some examples, system 2 may utilize protocol independent multicast (PIM) as a multicast routing protocol to control delivery of multicast traffic from sources to receivers or subscriber devices for particular multicast groups. PIM-SM is a multicast routing protocol that can use the underlying unicast routing information base or a separate multicast-capable routing information base. Routers within computer networks utilizing PIM-SM typically build unidirectional trees rooted at a central node, referred to as a Rendezvous Point (RP), per multicast group, and optionally create shortest-path trees per multicast source group combination. Further details regarding PIM-SM can be found in W. Fenner, et al., "Protocol Independent Multicast-Sparse Mode (PIM-SM)," RFC 4601, August 2006, the entire content of which is incorporated by reference herein. In some examples, upon detecting the presence of duplicate multicast traffic, PEs capable of sourcing the multicast traffic into a LAN exchange PIM Assert messages and ultimately elect an "assert winner" as the designated router for forwarding the multicast traffic.

In the example of FIG. 1, customer equipment 4A (e.g., "multicast source 4A") is a multicast source on VLAN 1. Customer equipment 4B and 4D are multicast receivers on VLAN2 and customer equipment 4C is a multicast receiver on VLAN1 (e.g., "multicast receivers 4B-4E"). Multicast receivers 4B-4E send PIM Join messages for, in this example, a multicast source and group (S,G), wherein the multicast source is multicast source 4A. PIM Join messages typically includes a unicast destination address of source multicast source 4A. Each PE that receives the PIM Join message may update one or more of its forwarding units to forward multicast traffic received from the multicast source to multicast receivers. A PIM Join message may be forwarded by multiple PEs along a path in a service provider network to a particular PE router that is directly coupled by an attachment circuit to the customer network that includes the multicast source. In some examples, a particular PE router that is directly coupled or locally coupled to the customer network may represent a configuration in which there are no other intervening PEs along a path (provided by the attachment circuit) between the particular PE and the customer network. Based on the PIM Join message, each PE router between the multicast receiver and multicast source may be configured, to forward multicast traffic received from the multicast source to the multicast receiver.

In FIG. 1, as described above, VLAN1 and VLAN2 may define two separate layer-2 domains. For each layer-2 domain in the EVPN, there may be a respective, corresponding layer-3 IP subnet in the PIM network. That is, there may be two separate layer-3 domains in the PIM network. In the example of FIG. 1, a first layer-3 IP subnet SN1 corresponds to VLAN1, and a second layer-3 IP subnet SN2 corresponds to VLAN2. For each layer-3 IP subnet, one of PEs 10 may be designated as the designated router (DR or PIM-DR in this disclosure). The DR for a particular layer-3 IP subnet is responsible for sending multicast traffic to other remote PEs in the same layer-3 IP subnet. In this way, the DR is used to centralize the forwarding of multicast traffic for a particular layer-3 IP subnet to prevent multiple PEs from sending the same multicast traffic. PEs 10 may elect a DR using one or more election techniques, such described in "Protocol Independent Multicast-Sparse Mode (PIM-SM): Protocol Specification (Revised)," August 2006, https://tools.ietf.org/html/rfc4601, which is hereby incorporated by reference herein in its entirety. In the example of FIG. 1, PE router 10C is the DR for SN1 and is also the DR for SN2.

Conventionally, if multicast source 4A sent multicast traffic originating within VLAN1, PE 10A would forward the multicast traffic to each of PEs 10B and 10C based on PIM Join messages that originated from multicast receivers 4B-4E and were previously forwarded by PEs 10B and 10C to PE 10A. In this process, PE 10B would forward the multicast traffic to multicast receiver 4C on VLAN1; however, because PE 10B is not the PIM-DR for bridging the layer-3 IP subnets SN1 and SN2 that correspond to the layer-2 VLAN1 and VLAN2, PE 10B may not forward the multicast traffic to multicast receiver 4D on VLAN2. Instead, when the PIM-DR PE 10C receives the multicast traffic from PE 10A, PE 10C bridges the multicast traffic from VLAN1 to VLAN2 by forwarding the multicast traffic from IRB 28C to IRB 30C. IRB 30C then broadcasts the multicast traffic to PEs 10A and 10B, which in turn forward the multicast traffic to multicast receivers 4B and 4D, respectively. In this conventional technique, the multicast traffic is forwarded by PE 10A to the PIM-DR PE 10C, which then bridges the traffic using one or more IRBs and sends the traffic back to PE 10A. This forwarding process may create a "hairpinning effect " by which multicast traffic is forwarded by PE 10A to the PIM-DR PE 10C and then back again to the same PE 10A. Such techniques may unnecessarily result in additional forwarding of multicast traffic through service provider network 12, when multicast source 4A and multicast receiver 4B are included in different layer-2 subnetwork but are directly attached by attachment circuits to the same PE 10A.

In accordance with techniques of the disclosure, PE 10A—although not the PIM-DR—may perform inter-subnetwork bridging using IRB 28A and 30A to locally forward traffic for a multicast receiver that is directly coupled to PE 10A by an attachment circuit. That is, PE 10A may locally bridge the multicast traffic from multicast source 4A on VLAN1 to multicast receiver 4B on VLAN2 without having the multicast traffic forwarded by PE 10A to PIM-DR PE 10C on VLAN1 and then forwarded back again to PE 10A on VLAN2. In other words, PE 10A may use IRB 28A and IRB28B to forward the multicast packet to the multicast receiver device, without receiving the multicast packet from another PE 10C that has been elected as the designated router on IRB 28B for the second layer-2 domain VLAN2 26A. In this way, by locally forwarding multicast traffic across layer-2 subnetworks at PE 10A, the techniques of this disclosure may avoid or prevent the "hairpinning effect" at PE router 10C for multicast traffic to be bridged from multicast source 4A on VLAN1 to multicast receiver 4B on VLAN2.

In operation, each of PEs 10 may configure its respective IRBs to forward multicast traffic to any multicast receivers that are in customer networks directly attached to the respective PE by an attachment circuit, regardless of whether the PE is the PIM-DR. In addition, each respective PE may send PIM Join messages towards the RP or the multicast source, if the respective PE has IGMP/MLD group membership regardless of whether the PE is the DR or IGPM/MLD querier. Furthermore, each of PEs 10 may be configured to forward multicast traffic, which is sent out of IRBs, to local attachment circuits only and not to other remote PEs. In this way, each IRB of a respective PE may operate as a DR (although not formally elected as a PIM-DR) for multicast receivers that are included in a customer network directly coupled to the PE by an attachment circuit. The formally elected PIM-DR is configured to continue operating as a PIM-DR for multicast sources.

By implementing the techniques of above, system 2 may perform inter-subnetwork multicast forwarding between multicast receivers and multicast sources and prevent or reduce hairpinning effects within the system. For example, in FIG. 1, multicast source 20A may send multicast traffic to PE 10A using attachment circuit 14A. PE 10A may perform a lookup using VRF 22A to forward network traffic to PEs 10B-10C using VLAN1. In accordance with techniques of the disclosure, IRB 28A also receives the multicast traffic. PE 10A is configured, based on VFR 22A, to forward the multicast traffic across VLAN1 and to VLAN2 locally to multicast receivers of VLAN2 that are included in customer networks directly attached to PE 10A by attachment circuits. For instance, multicast receiver 4B is included in customer network 18B, where customer network 18B is directly coupled to PE 10A by attachment circuit 14B. Accordingly, PE 10A forwards the multicast traffic received at IRB 28A to IRB 30A, thereby causing the multicast traffic to be bridged from VLAN1 to VLAN2. IRB 30A then forwards the multicast traffic to multicast receiver 4B. In this way, the multicast traffic need not be bridged at the PIM-DR PE 10C from VLAN1 to VLAN2 and forwarded back again to PE 10A on VLAN2 for forwarding to multicast receiver 4B. As such, the multicast traffic follows a path 32 from multicast source 4A to multicast receiver 4B.

Figure 2:
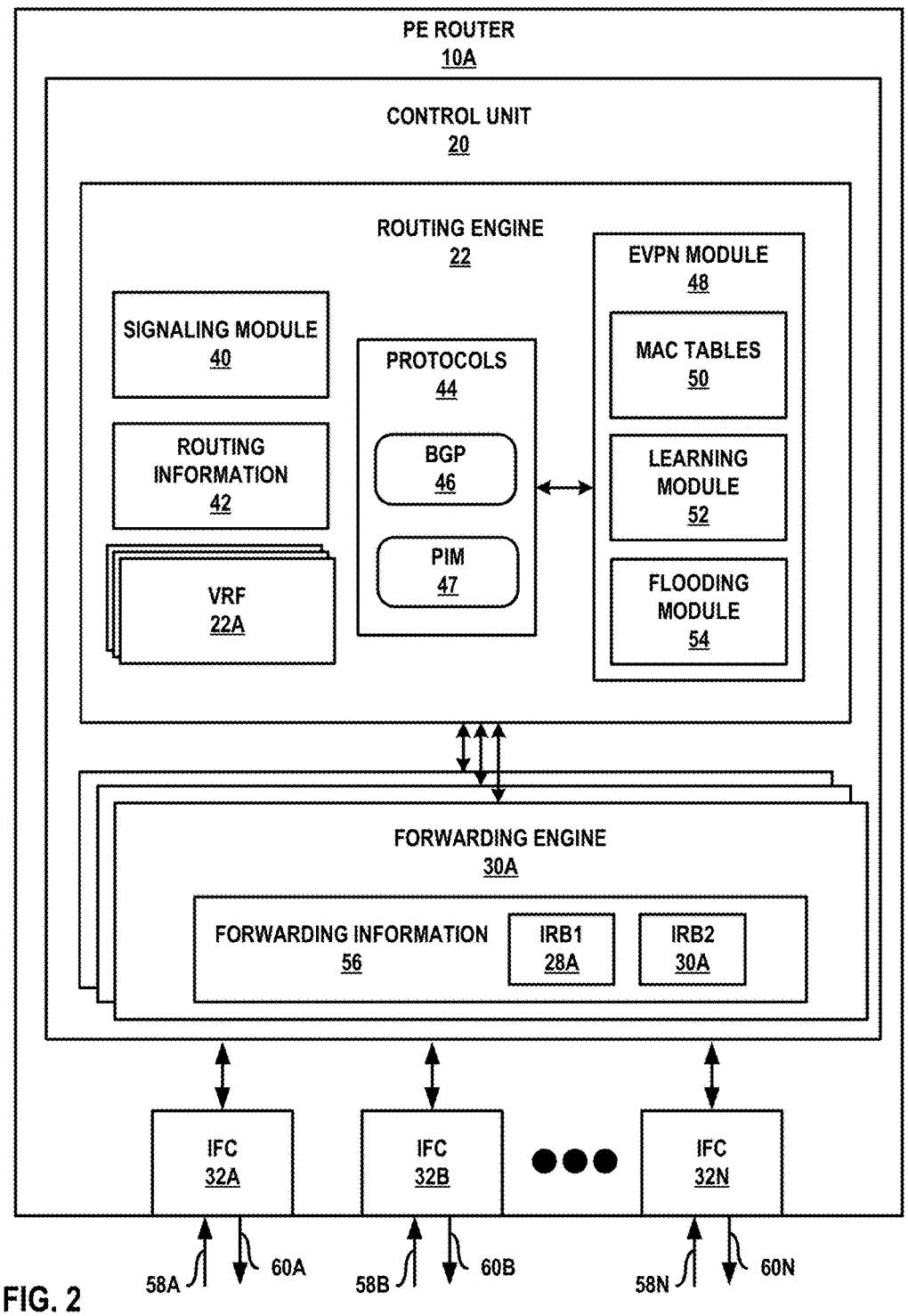
FIG. 2 is a block diagram illustrating further details of a network device that implements techniques to improve inter-subnet multicast forwarding, in accordance with techniques of the disclosure.

FIG. 2 is a block diagram illustrating further details of a network device that implements techniques to improve inter-subnet multicast forwarding, in accordance with techniques of the disclosure. PE 10A includes a control unit 20 that includes a routing engine 22 coupled to a forwarding engine 30A-30N. PE 10A includes interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. The protocols may be software processes executing on one or more processors. For example, routing engine 22 includes network protocols that operate at a network layer of the network stack. In the example of FIG. 2, network protocols include the Border Gateway Protocol (BGP) 46, which is a routing protocol. Routing engine 22 may include other protocols not shown in FIG. 2. Routing engine 22 is responsible for the maintenance of routing information 42 to reflect the current topology of a network and other network entities to which PE 10A is connected. In particular, routing protocols periodically update routing information 42 to accurately reflect the topology of the network and other entities based on routing protocol messages received by PE 10A.

As shown in the example of FIG. 2, protocols 44 may also include PIM 47. PIM 47 may represent the PIM protocol, which may operate in one or more modes, such as Dense Mode (DM), Sparse Mode (SM), Source-Specific Mode (SSM), and Bidirectional Mode (BIDIR). As shown in FIG. 2, each of PE 10A may implement VRF 22A. VRF 22A logically represents an instance of Virtual Routing Functionality implemented at PE 10A. VRF manages multiple routing tables that exist within single PE 10A. An attachment circuit, as shown in FIG. 1, may be associated with a particular VRF, such as VRF 22A, and the particular VRF may be configured to forward traffic for the attachment circuit. In some examples, VRF 22A may represent multiple VRF instances. In some examples, the multiple VRF instances may correspond to multiple different attachment circuits.

Forwarding engines 30A-30N ("forwarding engines 30" or "forwarding units") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE 10A receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 2, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A maintains forwarding information 56 for each Ethernet Virtual Instance (EVI) established by PE 10A to associate network destinations with specific next hops and the corresponding interface ports. As described an FIG. 1, an EVI may define one or more Ethernet Segments in an EVPN. In general, when PE 10A receives a data packet on an LSP of a given Ethernet segment via one of inbound links 58, forwarding engine 30A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the Ethernet segment. At this time, forwarding engine 30A may push and/or pop labels from the packet to forward the packet along a correct LSP.

Control unit 20 also includes an EVPN module 48 having flooding module 54 that performs flooding and a learning module 52 that performs layer two (L2) learning, e.g., learning of customer device MAC addresses from inbound Label Switch Paths (LSPs) and association of those customer MAC addresses with corresponding outbound LSPs and output interfaces. EVPN module 48 may maintain MAC tables 50 for each EVI established by PE 10A, or in alternative examples may maintain one or more MAC tables that are independent of each respective EVI. Learning module 52 and flooding module 54 may alternatively reside within forwarding engine 45.

Signaling module 40 outputs control-plane messages to automatically establish LSPs, Ethernet Segments, and otherwise provision one or more EVPNs between PE 10A and each of the other PE routers 10. Signaling module 40 may signal the PE routers 10 using one or more suitable L3 protocols, such as the BGP. Signaling module 40 can communicate with forwarding engine 30A to automatically update forwarding information 56.

EVPN module 48 executes in the control plane of PE 10A and performs MAC address learning to automatically update portions of forwarding information 56 for each EVI established by PE 10A. In some examples, EVPN module 48 is invoked when PE 10A receives data packets on the LSPs established by router PE 10A for one or more of the PE 10 that are members of an EVI. EVPN module 48 performs MAC address learning using learning module 52 and updates the one of MAC tables 50 to initially record associations between the LSPs connected to PE 10A and the source MAC addresses of the EVPN customer devices from which the data packets were received on the LSPs. For example, the one of MAC tables 50 records LSP identifiers that identify the LSPs connected to PE 10A, and records MAC addresses that identify the source customer devices of the data packets transmitted over the LSPs. In effect, router PE 10A, an L3 routing device (or in some examples, an L2 switching device), learns associations between MAC addresses and LSPs (which are mapped to ports or interfaces), much as an L2 switch learns associations between MAC addresses and ports. Forwarding information 56 may represent a virtual port binding and bridging table.

In order to update the one of the MAC tables 50, learning module 52 of EVPN module 48 in routing engine 22 performs L2 learning and association of L2 customer MAC addresses with specific LSPs. Learning module 52 then communicates information recorded in the one of MAC tables 50 to configure forwarding information 56. In this way, forwarding engine 30A may be programmed with associations between each LSP and output interface and specific source customer MAC addresses reachable via those LSPs. EVPN module 48 may communicate with forwarding engines 30 to update the one of MAC tables 50 associated with the EVPN to associate the customer MAC addresses with the appropriate outbound LSP. In some examples, forwarding engine 30A may maintain local MAC tables (not shown). After the update, MAC tables 50 include associations between the LSPs connected to PE 10A that are used to transport L2 traffic to the MAC addresses of the customer devices. In other words, MAC tables 50 records associations between the LSPs and the network devices to which data packets may be sent on the LSPs. For example, MAC tables 50 may record LSP identifiers that identify the LSPs sourced by PE 10A, and for those LSP identifiers that identify the MAC addresses of the reachable customer devices.

Forwarding engine 30A receives data packets on inbound links 58 that are destined for one of the PE routers in the EVPN. Forwarding engine 30A determines whether the destination customer MAC address of the data packets is included in the one of MAC tables associated with the EVPN. If the MAC address is included in the one of MAC tables, then PE 10A forwards the data packets to the destination PE router on the LSP associated with the MAC address based on forwarding information 56 associated with the EVPN. If the customer MAC address is not included in the one of MAC tables, PE 10A floods the data packets to all of the PE routers via the LSPs based on forwarding information 56 associated with the EVPN. Example details of MAC learning by a router are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

As shown in FIG. 2, routing information 42 may implement techniques of this disclosure for improving inter-subnet multicast forwarding by avoiding hair-pinning when delivering multicast traffic to receivers on different IP subnet. However, in some examples, one or more modules other than bridge module 45 may implement techniques of this disclosure. In the example of FIG. 2, routing information 42 may configure IRB1 28A and IRB2 30A using routing information provided by VRF 22A. Routing information 42 may configure IRB1 28A to receive network traffic on VLAN1, as illustrated in FIG. 1. Routing information 42 may also configure IRB2 30A to forward network traffic on VLAN2, as shown in FIG. 1. Routing information 42 may also configure IRB2 30A to receive network traffic from IRB1 28A, such that IRB2 30A receives multicast traffic from IRB1 28A that originated on VLAN1 and forwards the multicast traffic on VLAN2.

In accordance with techniques of the disclosure, one or more of IRB1 28A and IRB2 30A may be configured by routing information 42 to operate as a designated router (although not formally elected as the PIM-DR) for multicast traffic destined for a multicast receiver that is included in a customer network directly attached to PE 10A by an attachment circuit. For example, multicast receiver 4B may initially sent a PIM Join to PE 10A to request multicast traffic from multicast source 4A. Upon receiving the PIM Join, routing information 42 configures IRB2 30A to receive multicast traffic from IRB1 28A. That is, routing information 42 may configure one or more next hops to in forwarding information 56 that cause IRB1 28A to forward network traffic received on VLAN to IRB2 30A, which forwards the network traffic on VLAN2. Therefore, rather than PE 10A simply dropping the PIM Join because it is not the PIM-DR for VLAN2, techniques of the disclosure cause PE 10A to configure IRB1 28A and IRB2 30A to bridge the multicast traffic from VLAN1 to VLAN2.

If IRB2 30A receives multicast traffic from IRB1 28A, then IRB2 30A may only flood the multicast traffic to its local access interface(s) (e.g., attachment circuits). Local access interfaces may be interfaces of PE 10A coupled to customer networks including multicast receivers. However, IRB2 30A may not flood the multicast traffic to other remote PEs (e.g., PEs 10B-10C) because the other remote PEs (configured similarly to PE 10A in accordance with techniques of the disclosure), will forward the multicast traffic across their own respective IRBs to local access receiver interfaces. As such, routing information 42 may also configure one or more next hops in forwarding information 56 to prevent IRB2 30A from flooding the multicast traffic to remote PEs on VLAN2. In other words, routing information 42 may determine that multicast receiver 4B is included in a customer network 18B that is directly coupled to PE 10A by an attachment circuit 18B and install at least one next hop in forwarding engine 30A that causes the multicast traffic received by the IRB2 30A from IRB1 28A to be forwarded by forwarding engine 30A to multicast receiver 4B using local access interface 32A (e.g., an attachment circuit).

In some examples, techniques of the disclosure may not apply to multicast traffic destined to 224.0.0.x. In such examples, basic EVPN flood procedure may still apply to multicast traffic addressed to 224.0.0.x, that is, IRB shall still flooded those packet to all its local ACs as well as all remote PEs. For example, with EVPN, a layer-2 domain spans across multiple PEs. Multicast traffic received from a local AC or IRB is conventionally sent to other sites as well. However, in accordance with techniques of this disclosure, multicast traffic sent from IRB interfaces may not be sent to other sites (unless they're link-local, e.g. in case of IPv4 addressed to 224.0.0.0/24). As such, techniques of the disclosure may prevent packet duplication that otherwise would happen because non-DRs on IRB interfaces will also forward the traffic.

Upon configuring PE 10A as described above, multicast source 20A may send multicast traffic to PE 10A using attachment circuit 14A. PE 10A may perform a lookup using forwarding information 56 that is based on routing information of VRF 22A and forward the multicast traffic across VLAN1 and to VLAN2 locally (e.g., within PE 10A) to multicast receivers of VLAN2 that are included in customer networks directly attached to PE 10A by attachment circuits. For instance, multicast receiver 4B is included in customer network 18B, where customer network 18B is directly coupled to PE 10A by attachment circuit 14B. Accordingly, PE 10A forwards the multicast traffic received at IRB1 28A to IRB2 30A, thereby causing the multicast traffic to be bridged from VLAN1 to VLAN2. IRB 28A then forwards the multicast traffic to multicast receiver 4B. In this way, it may not be necessary for the multicast traffic to be bridged at the PIM-DR PE 10C, from VLAN1 to VLAN2, and forwarded back again to PE 10A on VLAN2 for forwarding to multicast receiver 4B. As such, the multicast traffic follows a path 31, as shown in FIG. 1, from multicast source 4A to multicast receiver 4B.

Elements of control unit 20 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10C, e.g., protocols. Control unit 20, in some examples, retrieves and executes the instructions from memory for these aspects.

Figure 3:
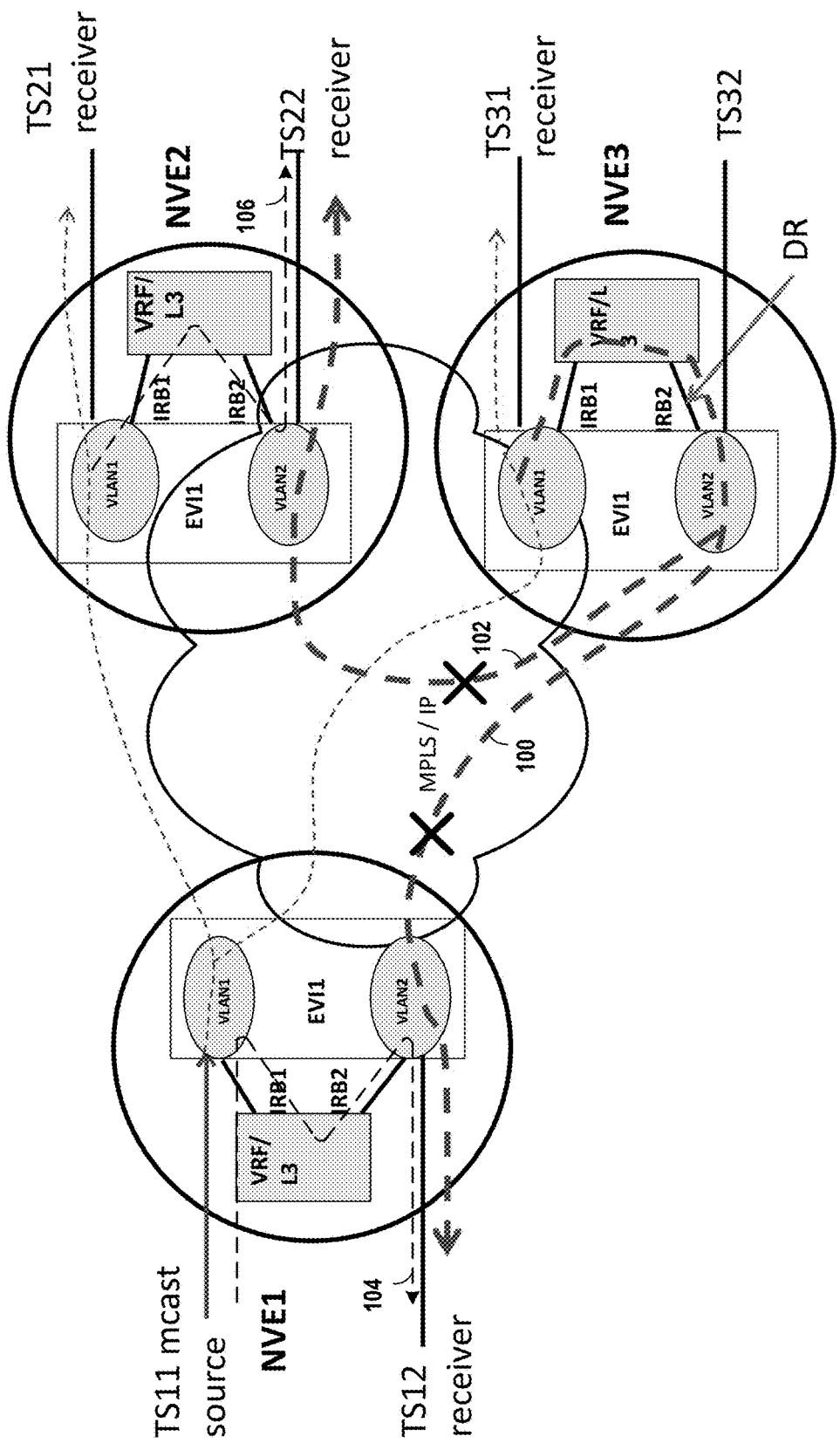
FIG. 3 is a block diagram illustrating an example system that may include a network device that implements techniques to improve inter-subnet multicast forwarding, in accordance with techniques of the disclosure.

FIG. 3 is a block diagram illustrating an example system that may include a network device that implements techniques to improve inter-subnet multicast forwarding, in accordance with techniques of the disclosure. As shown in FIGS. 3-8, NVE1, NVE2, and NVE3 may each represent one or more PEs as described in FIGS. 1-2. For instance, NVE1 may correspond to PE 10A, NVE2 may correspond to PE 10B, and NVE3 may correspond to PE10C.

As described in FIG. 1, an EVPN may provide an extensible and flexible multi-homing VPN solution for intra-subnet connectivity among hosts/VMs over an MPLS/IP network. When forwarding among hosts/VMs across different IP subnet, NVE1-NVe3 may implement Integrated Routing and Bridging (IRB) as described in ietf-bess-evpn-inter-subnet-forwarding. A Network Virtualization Edge (NVE) device supporting IRB may be referred to as an L3 Gateway. In a centralized approach, a centralized gateway provides all L3 routine functionality, and even network traffic from two Tenant Systems (TS) on two subnets connected to the same NVE may need to be carried through a remote central gateway, which may inefficient. In a distributed approach, each NVE (or most NVEs) may have one or more configured IRBs, and inter-subnet traffic will be locally routed without having to go through a central gateway.

In the topology illustrated in FIG. 3, there are three NVEs: NVE1, NVE2 and NVE3 that share the same EVI1 that includes two domain VLAN1 and VLAN2 respectively. EVI1 may belong to a customer that uses both VLAN1 and VLAN2, so from an L3 perspective, VLAN1 and VLAN2 are connected to the same L3-VRF through IRB1 and IRB2 respectively. TS11 may represent CE 4A of FIG. 1, TS12 may represent CE 4B of FIG. 1, TS21 may represent CE 4C of FIG. 1, TS22 may represent CE 4D of FIG. 1, TS31 may represent CE 20 of FIG. 1, and TS32 may represent CE 4F in FIG. 1. From a L3 perspective TSs attached to VLAN1 are on subnet SN1 and TSs attached VLAN2 are on subnet SN2. There is a multicast source TS11 on subnet SN1. There are four receivers: TS21, TS31 on the subnet SN1 and TS12, TS22 on the subnet SN2. On subnet SN1 NVE1 is the PIM-DR while on subnet SN2 NVE3 is the PIM-DR. From L3 point of view, those NVEs are routers connected to the virtual LAN on both subnet SN1 and subnet SN2 through IRB interfaces. Both source and receivers are locally attached to NVEs.

One of the L3 gateways, e.g., one of PEs 10, is the IGMP/MLD (Internet Group Management Protocol (IGMP)/Multicast Listener Discovery (MLD)) querier and it sends queries out of its IRB interface. These queries are forwarded throughout its subnet following EVPN BUM procedures. If a TS is a multicast receiver, it follows IGMP/MLD procedure to send join via multicast. These joins are also forwarded throughout its subnet following EVPN BUM procedure. On a conventional LAN, only one router may send multicast to the LAN. That is, either the PIM-DR or IGMP/MLD querier (when PIM is not needed—e.g., the LAN is a stub network). On the source network, PIM is typically needed so that traffic can be delivered to other routers. For example, in case of PIM-SM, the DR on the source network encapsulates the initial packets for a particular flow in PIM Register messages and send to the RP, triggering necessary states for that flow to be built throughout the network.

Following the EVPN Broadcast, Unknown Unicast or Multicast (BUM) procedure, the multicast traffic from the source at TS11 on subnet SN1 is forwarded to all TSs belongs to EVI1—i.e. TS21 and TS31 on subnet SN1. The three gateways also receive the multicast traffic on their IRB1 interfaces that is on subnet SN1. Once the multicast traffic is received on the IRB1 interface, it is routed first based on the L3 multicast delivering procedure in L3 VRF (Virtual Routing and Forwarding instance(s)). From the L3 perspective, only the NVE3 may act as the DR on subnet SN2 forwards the received multicast traffic out its IRB2 interface on subnet SN2. Since NVE1 and NVE2 are not the DR on subnet SN2, they do not forward the multicast traffic out of each routers respective IRB2 interfaces. Once the multicast traffic is sent out the subnet SN2 on IRB2 interface of NVE3, it is forwarded back, conventionally, to the remote NVE1 and NVE2 and to be delivered to the receivers on subnet SN2 following EVPN BUM traffic delivering procedure. NVE1 and NVE2 receive the traffic from subnet SN1 and also on their IRB interfaces for subnet SN1, but NVE1 and NVE2 do not route to subnet SN2 if they are not the DRs. Instead, they wait to receive traffic from NVE3. For example, conventionally, for receivers connected to NVE1 but on different IP subnet as the multicast source, the multicast traffic from source TS12 has to go from NVE1 to NVE3 and then back to NVE1 and NVE2 as multicast traffic streams 100 and 102, respectively, before the multicast traffic is forwarded by NVE1 and NVE2 to the receiver TS12 on SN2 and TS22 on SN2. This illustrates the potential hair-pinning problem with centralized approach (multicast traffic forwarding is centralized via the DR), even though distributed approach is being used for unicast (in that each NVE is supporting IRB and routing inter-subnet unicast traffic locally).

PEs 10 may implement techniques of the disclosure to avoid the potential hair-pinning problem. To avoid hair-pinning, on IRB interfaces IRB1 and IRB2 of NVE1-NVE3 each NVE may forward multicast traffic as long as there are multicast receivers for the traffic, regardless if the NVE is the PIM-DR or not. On the IRB interfaces IRB1 and IRB2 of NVE1-NVE3, each NVE may send PIM Join messages received from multicast receivers towards a rendezvous point (RP) or source if has IGMP/MLD group membership, regardless of whether the NVE is the PIM-DR/querier or not. Multicast data traffic sent out of the IRB interfaces IRB1 and IRB2 of NVE1-NVE3 may forwarded to local Attachment circuits (ACs) only and not to other NVE(s). Each NVE may behave as a DR/querier for multicast receivers. In some examples, each NVE may behave as a DR/querier for multicast receivers, but only the formally elected DR behaves as a DR for multicast sources. As illustrated in FIG. 3, when NVE1 receives traffic on its IRB1 interface NVE1 will route the traffic out of its IRB2 and deliver to local receiver TS12. As such, the multicast traffic from multicast source TS11 to multicast receiver TS12 follows a path 104. NVE1 may also send register messages to the RP, since it is the DR on the source network, i.e. SN1. Both NVE2 and NVE3 may receive the traffic on IRB1 but neither sends register messages to the RP, since they are not the DR on the source subnet SN1. NVE2 will route the traffic out of its IRB2 and deliver to its local receiver TS22. As such, the multicast traffic from multicast source TS11 to multicast receiver TS22 follows a path 106.

In the example of FIG. 3, NVE1 is the PIM-DR for VLAN1 and NVE3 is the PIM-DR for VLAN2. Moreover, NVE3 does not include a multicast receiver for VLAN2. Because NVE3 is configured in accordance with techniques of the disclosure to behave as a DR/querier for multicast receivers that are included in customer networks directly attached to NVE3 by an attachment circuit, but not behave as the PIM-DR for VLAN1 (i.e., the source network), NVE3 does not broadcast multicast traffic streams 100 and 102 to NVE1 and NVE2 on VLAN2.

In the above example, NVE3 may receive IGMP/MLD joins from TS12 and TS22 and will route packets out of IRB2 of NVE3, even though there are no receivers at the local site. IGMP/MLD snooping on NVE3 may prevent the traffic from actually being sent out of attachment circuits but from the L3 perspective there will still be related states and processing/forwarding (e.g., IRB2 will be in the downstream interface list for PIM join (e.g., multicast join messages) states and forwarding routes). To prevent NVE3 from learning those remote receivers at all, IGMP/MLD snooping may be used to suppress the PIM Joins from being sent to remote sites, if there is an IRB interface. With that, in the above example NVE3 may not learn of receiver TS12 and TS22 at all and will not try to route packets out of IRB2.

The same hair-pinning effect for multicast traffic delivery, as described in FIG. 3, may also exist on a VLAN aware bundle service. That is, techniques of this disclosure may also be applied to avoid the hair-pinning effect for inter-subnet multicast traffic delivery in a VLAN aware bundle service, which may be implemented in FIG. 3. In this way, the same solution of FIGS. 1-3 may be applied to the VLAN aware bundle service to achieve improved or optimal inter-subnet multicast delivery.

Figure 4:
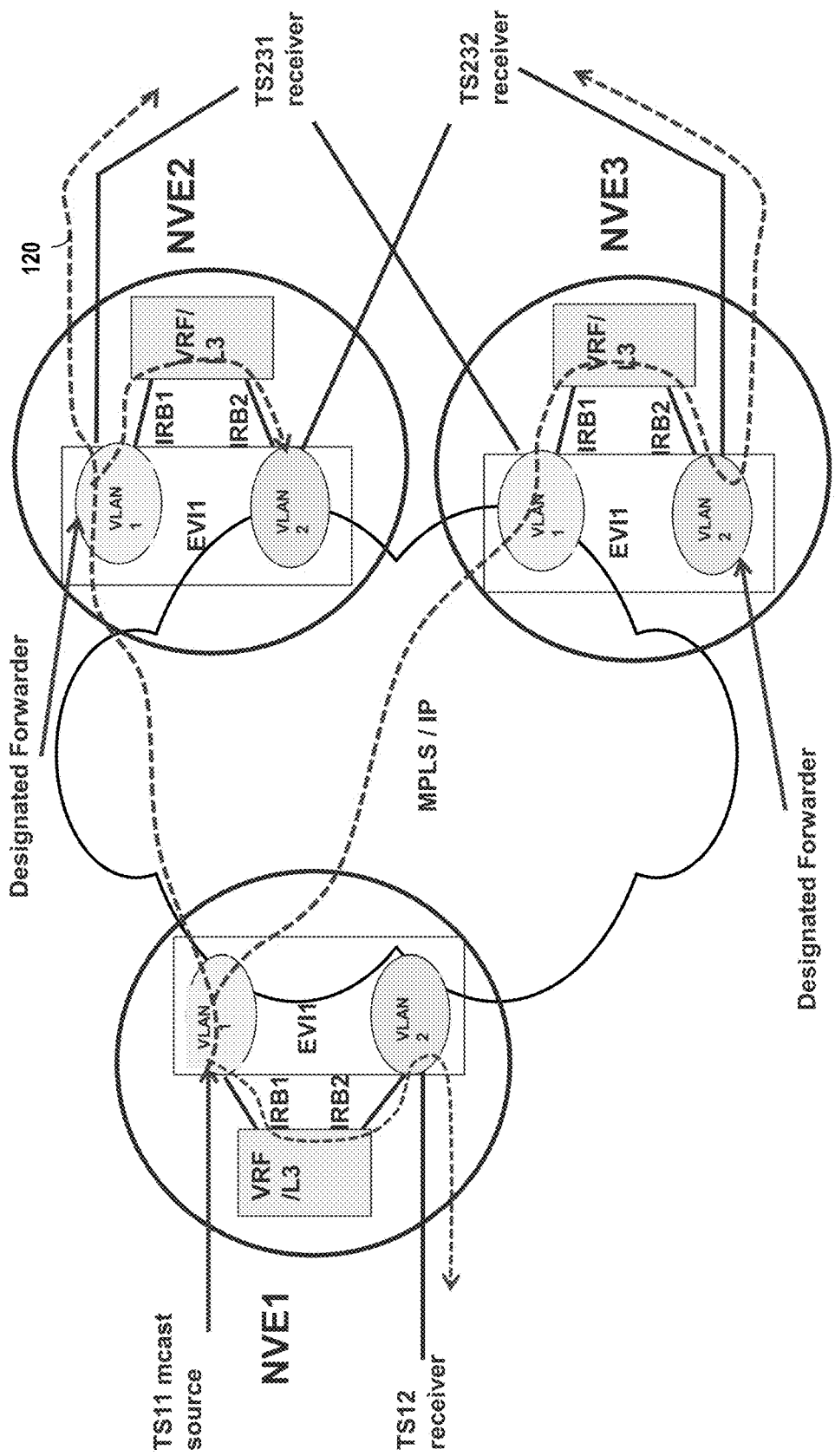
FIG. 4 is a block diagram illustrating an example system comprising a network device that implements techniques to improve inter-subnet multicast forwarding in a multi-homed environment, in accordance with techniques of the disclosure.

FIG. 4 is a block diagram illustrating an example system comprising a network device that implements techniques to improve inter-subnet multicast forwarding in a multi-homed environment, in accordance with techniques of the disclosure. Techniques of this disclosure, such as in FIGS. 1-3, may also be used for a receiver that is multi-homed to EVPN PEs. This is illustrated in FIG. 4. As shown in FIG. 4, multicast receiver TS231 may be multi-homed to NVE2 and NVE3. In a similar way, TS232 may be multi-homed to NVE2 and NVE3. Receiver TS231 is on subnet SN1 and receiver TS232 is on subnet SN2. When IRBs on NVE1 and NVE2 forward multicast traffic to their respective local attached access interface(s) based on an EVPN BUM procedure, only the DF for the Ethernet Segment (ES) may deliver multicast traffic to its multi-homed receiver. For instance, NVE1 may be the DF for VLAN1 that corresponds to SN1, while NVE2 may be the DF for VLAN2 that corresponds to SN2. Hence no duplicated multicast traffic may be forwarded to TS231 or TS232.

In FIG. 4, NVE2 is the DF in the ES that corresponds to VLAN1. Therefore, upon receiving multicast traffic for multicast receiver TS231, which is also on VLAN1, NVE2 may forward the network traffic to TS231. NVE3 may not forward the multicast traffic to multicast receiver TS231 because NVE3 is not the DF for VLAN1, although TS232 is multi-homed to NVE3 (and NVE2). In a similar manner, NVE3 is the DF in the ES that corresponds to VLAN2. Upon receiving multicast traffic for multicast receiver TS232, which is also on VLAN1, NVE3 may forward the multicast traffic using IRB1 and IRB2 of NVE3, because NVE3 is the PIM-DR for VLAN2. NVE3 may forward the network traffic to TS232. NVE2 may not forward the multicast traffic to multicast receiver TS323 because NVE2 is not the DF for VLAN2, although TS232 is multi-homed to NVE2 (and NVE3).

In some examples, if there is a mix of multi-homed NVEs, such as where some NVEs have IRB interfaces while others do not have IRB interfaces, techniques of this disclosure propose the addition of a new TLV, the IRB PIM Capable TLV, for this purpose. The TLV may be attached to an EVPN type-4 ES route. NVEs without IRB interface are the IRB PIM non-capable PEs. The IRB PIM Capable PEs attached to a given ES may use the DF election procedure defined in section 8.5 of [RFC7432] to elect an inter-subnet multicast DF for each EVI defined on that ES. RFC7432 entitled "BGP MPLS-Based Ethernet VPN," February 2015, https://tools.ietf.org/html/rfc7432, is hereby incorporated by reference herein in its entirety.

In some examples, if all-active multihoming is used then there may be a mixture of IRB PIM non-capable and capable PEs, and there may be more than one IRB PIM capable PE. Because only one IRB PIM capable PE may send inter-subnet multicast to the CE, techniques of the disclosure provide a mechanism for the IRB PIM capable PEs to discover each other and elect a designated forwarder. Techniques of the disclosure provide the addition of a new TLV, the IRB PIM Capable TLV, for this purpose. The IRB PIM Capable PEs attached to a given Ethernet Segment will use the DF election procedure defined in section 8.5 of [RFC7432] to elect an inter-subnet multicast DF for each EVI defined on that ES. Because inter-subnet multicast forwarding, by definition, may imply multiple domains within an EVI, inter-subnet multicast forwarding may, in some examples, only be used in an EVI that supports VLAN Aware Bundle service. In some examples, a standard, IRB PIM non-capable PE, may never perform inter-subnet multicast forwarding, so the standard DF election procedure defined in section 5 of [RFC7432] may be used by all PEs, IRB PIM non-capable and capable, to elect an L2 DF for each EVI defined on that ES. In other words, the election of both sets of DFs may be independent and a given PE may simultaneously be in both sets.

Figure 5:
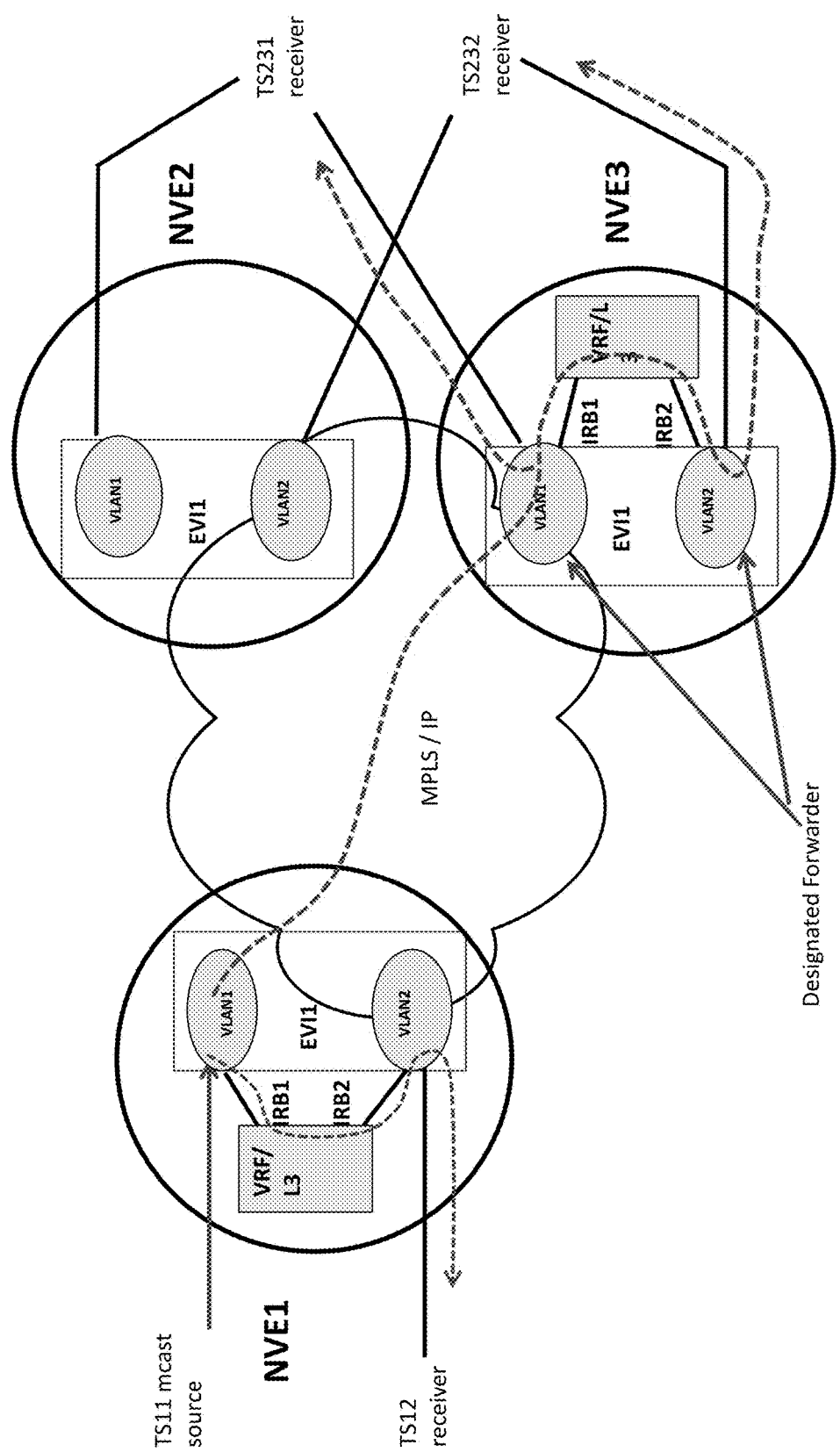
FIG. 5 is a block diagram illustrating an example system comprising a network device that implements techniques to improve inter-subnet multicast forwarding in an environment with an NVE that does not include an IRB interface, in accordance with techniques of the disclosure.

FIG. 5 is a block diagram illustrating an example system comprising a network device that implements techniques to improve inter-subnet multicast forwarding in an environment with an NVE that does not include an IRB interface, in accordance with techniques of the disclosure. Techniques of this disclosure, such as in FIGS. 1-4, may also be used in an environment where an NVE does not include an IRB interface. This is illustrated in FIG. 5.

In some instances, the standard DF election procedure defined in section 5 of [RFC7432] may be used by all PEs, both IRB PIM non-capable and capable, to elect an L2 DF that is IRB PIM capable for each EVI defined on that ES.

Using the multi-homing example of FIG. 4, but modified in FIG. 5, NVE2 does not have IRB interface and by using the IRB PIM capable TLV, NVE3 may be elected as DF for both ESs. As result, the multicast traffic may be delivered to TS231 and TS232 through NVE3. This is illustrated in FIG. 5.

As shown in FIG. 5, is possible that a particular NVE, such as NVE2, may not have an IRB interface. For receivers on the same L2 domain (i.e. on same IP subnet) as the multicast source, such as TS231, the multicast traffic will be delivered by NVE1-NVE3 based on EVPN BUM procedure. If, however, a multicast receiver is on a different L2 domain (i.e. on different subnets) as the multicast source, such as multicast receiver TS232 and multicast source TS11, the multicast receiver TS232 receives the multicast traffic from one of NVEs that has the IRB on the same L2 domain as the receivers. For example, NVE3 has an IRB on the same L2 domain as multicast receiver TS323. Therefore, NVE3 forwards the multicast traffic received from multicast receiver TS11 from VLAN1 to VLAN2 and forwards the multicast traffic using IRB2 to multicast receiver TS232 on VLAN2. Multicast receiver TS232 receives the multicast traffic from the DR, NVE3, of that subnet VLAN2.

In some examples, if an NVE does not have any IRBs, such as NVE2, then the DR, NVE3, may use a separate provider tunnel to deliver traffic only to sites that do not have IRB interfaces. For instance, NVE3 may advertise the tunnel to NVE2 via a separate Multicast Ethernet Tag Route. In some examples, only NVEs without IRBs, such as NVE2, will join that tunnel advertised by NVE3. For instance, NVE3 may determine that NVE2 does not include any IRBs while NVE1 does include IRBs. NVE3 may advertise a tunnel to NVE2 that NVE2 joins. When NVE3 receives multicast traffic from NVE1 to forward from VLAN1 to VLAN2, NVE3 may send the network traffic on VLAN2 using the advertised tunnel to NVE2 but not NVE1. Upon receiving the multicast traffic via the tunnel on VLAN2, NVE2 may forward to the multicast traffic to TS232. In other words, when NVE2 does not include an IRB interface, then NVE3 may tunnel multicast traffic from NVE1 to NVE2, without forwarding the multicast traffic back to NVE1.

Figure 6:
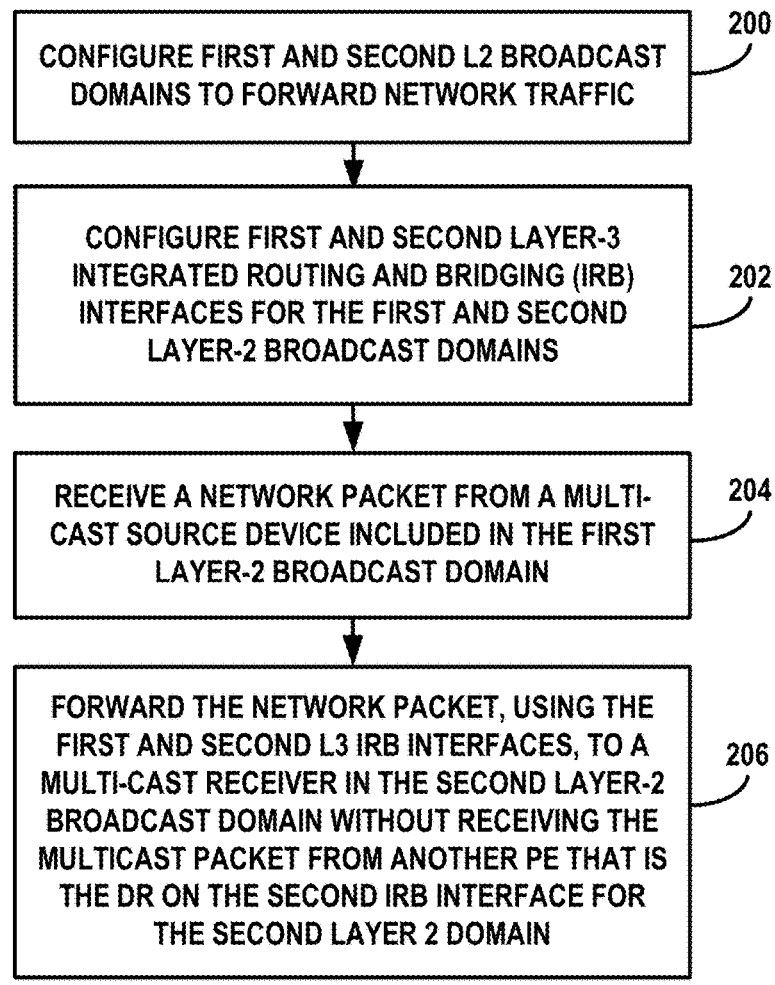
FIG. 6 is flowchart illustrating example operations of a network device that may improve inter-subnet multicast forwarding in an EVPN when delivering multicast traffic to receivers on different IP subnet, in accordance with techniques of the disclosure.

FIG. 6 is flowchart illustrating example operations of a network device that may improve inter-subnet multicast forwarding in an EVPN when delivering multicast traffic to receivers on different IP subnet, in accordance with techniques of the disclosure. For purposes of illustration, the example operations are described below within the context of PE 10A of this disclosure. PE 10A may configure first and second L2 domains (200). For instance, PE 10A may configure VLAN1 as a first L2 domain that corresponds to IP subnet SN1, as shown in FIG. 1. PE 10A may also configure VLAN2 as a second L2 domain that corresponds to IP subnet SN2, as shown in FIG. 1. PEs 10B and 10C may be similarly configured to forward network traffic using VLAN1 and VLAN2.

PE 10A may configure a first layer-3 Integrated Routing and Bridging (IRB) interface for the first layer-2 domain, e.g., VLAN1 and a second IRB for the second layer-2 domain, e.g., VLAN2 (202). For instance PE 10A may configure IRB1 as shown in FIG. 1 to receive network traffic on VLAN1. PE 10A may also configure IRB2 as shown in FIG. 1 to forward network traffic on VLAN2. In some examples, PE 10A may also configure IRB2 to receive network traffic from IRB1, such that IRB2 receives multicast traffic from IRB1 that originated on VLAN1 and forwards the multicast traffic on VLAN2.

PE 10A may receive a network packet in multicast traffic from multicast source device 4A (204). Multicast source 4A may be included in the first layer-2 domain, VLAN1. The network packet in the multicast traffic may be destined for a multicast receiver 4B, which is included in the second layer-2 domain, VLAN2. In response to receiving the network packet, PE 10A may forward, using the layer-3 IRB interface, the network packet to the multicast receiver 4B (206). In this way, the network packet may follow path 31 as shown in FIG. 1, rather than being forwarded to the PIM-DR PE 10C before being forwarded again by PE 10A to multicast receiver 4B. As such, the network packet may be forwarded by PE 10A to multicast receiver 4B without receiving the multicast packet from another PE 10C that has been elected as the DR on the second IRB interface for the second layer-2 domain.

Techniques of this disclosure may provide improved or optimal routing for inter-subnet multicast traffic forwarding. Without the techniques described in this invention inter-subnet multicast traffic may be subject to hair-pinning effect. Hair-pinning effect may waste bandwidth in the MPLS/IP core network. With the techniques described in this disclosure, multicast traffic across the IP subnet may be forwarded locally on the NVE when NVE has IRB interfaces configured. Techniques of this disclosure may be applied to EVPN or EVPN overlay network for inter-subnet multicast forwarding. EVPN or EVPN overlay networks may be used in data center applications.

In accordance with techniques of the disclosure, from the layer-3 perspective, a PE may not require an IRB interface to be PIM DR in order to route packets out of that IRB interface for receivers local to the IRB, where "local" refers to layer-3 locality. As such, techniques of the disclosure may allow two PEs (PE1 and PE2) connected to the same layer-2 domain and a receiver to be directly attached to PE2 only, but at the IRB level. The receiver may still be local to PE1 on the IRB2 interface for the layer-2 domain, and at layer-3 PE1 will route packets out of IRB2, though actual forwarding to that remote-at-layer-2 receiver will be stopped because for multicast packet routed out of the IRB interface, while forwarding at layer-2, the multicast packet may not be sent to remote sites (that are connected to other PEs). To prevent PE1 from trying to route packets of IRB2 for receivers local from the layer 3 perspective but remote from the layer 2 perspective, techniques of the disclosure may use snooping on PE2 to prevent PE1 from learning of that receiver.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

Further details and example embodiments are described in the Appendix, the entire contents of which are incorporated herein by reference.

What is claimed is:

1. A method comprising:
   configuring, by a first provider edge router, first and second layer-2 domains to forward network traffic;
   configuring, by the first provider edge router, a first layer-3 Integrated Routing and Bridging (IRB) interface for the first layer-2 domain and a second layer-3 IRB interface for the second layer-2 domain;
   receiving, by the first provider edge router, a multicast packet from a multicast source device, the multicast source device being included in the first layer-2 domain, the multicast packet having a multicast receiver device in the second layer-2 domain, wherein a second provider edge router is elected as a designated router for forwarding multicast traffic on the second layer-3 IRB interface of the second layer-2 domain, and wherein the first provider edge router is a non-designated router for the second layer-3 IRB interface of the second layer-2 domain; and
   forwarding, by the first provider edge router and using the first and second layer-3 IRB interfaces, the multicast packet to the multicast receiver device, without receiving the multicast packet from the second provider edge router that has been elected as the designated router for the second layer-3 IRB interface of the second layer-2 domain.

2. The method of claim 1,
   wherein the multicast receiver device is directly coupled to the first provider edge router by an attachment circuit of the plurality of attachment circuits, and
   wherein forwarding the multicast packet to the multicast receiver device comprises forwarding, by the first provider edge router and using the attachment circuit, the multicast packet to the multicast receiver device.

3. The method of claim 1, further comprising:
   configuring the first layer-3 IRB interface at the first provider edge router to send and receive multicast traffic in the first layer-2 domain;
   configuring the second layer-3 IRB interface at the first provider edge router to send and receive multicast traffic in the second layer-2 domain;
   determining the multicast receiver device is included in a customer network that is directly coupled to the first provider edge router by an attachment circuit; and
   installing at least one next hop in a forwarding unit of the first provider edge router that causes the multicast packet received by the second layer-3 IRB interface to be forwarded by the forwarding unit to the multicast receiver device using the attachment circuit.

4. The method of claim 1, further comprising:
   snooping, by the first provider edge router, for multicast join messages that are received from multicast receivers in the second layer-2 domain; and
   suppressing, by the first provider edge router, forwarding of the multicast join messages to other provider edge routers included in the second layer-2 domain.

5. The method of claim 1, wherein the first provider edge router is configured in a Virtual Local Area Network (VLAN) aware bundle service.

6. The method of claim 1,
   wherein the multicast receiver device is a first multicast receiver device, wherein a second multicast receiver device is multi-homed in an Ethernet Virtual Private Network (EVPN) to the second provider edge router and a third provider edge router,
   wherein the second provider edge router is the designated router in the EVPN for forwarding multicast traffic for the second layer-2 domain, and
   wherein the multicast packet is forwarded by the second provider edge router to the multicast receiver device, without being forwarded by the third provider edge router.

7. The method of claim 1,
   wherein the first provider edge router is configured in an Ethernet Virtual Private Network (EVPN) with the second provider edge router and a third provider edge router, wherein the second provider edge router is the designated router on the second layer-3 IRB interface for the second layer-2 domain;
   wherein the multicast receiver device is a first multicast receiver device attached to the first provider edge router, and wherein a second multicast receiver device is attached in the EVPN to the second provider edge router;
   wherein the third provider edge router does not include an IRB interface, and the second provider edge router tunnels multicast traffic from the first provider edge router to the third provider edge router, without forwarding the multicast traffic back to the first provider edge router.

8. The method of claim 1, wherein the first provider edge router is configured in an EVPN.

9. A first provider edge router comprising:
at least one processor; and
at least one module, operable by the at least one processor to:
configure first and second layer-2 domains to forward network traffic;
configure a first layer-3 Integrated Routing and Bridging (IRB) interface of the first layer-2 domain and a second layer-3 IRB interface of the second layer 2 domain;
receive a multicast packet from a multicast source device, the multicast source device being included in the first layer-2 domain, the multicast packet having a multicast receiver device in the second layer-2 domain, wherein a second provider edge router is elected as a designated router for forwarding multicast traffic on the second layer-3 IRB interface of the second layer-2 domain, and wherein the first provider edge router is a non-designated router for the second layer-3 IRB interface of the second layer-2 domain; and
at least one forwarding unit operable to:
forward, using the first and second layer-3 IRB interfaces, the multicast packet to the multicast receiver device, without receiving the multicast packet from the second provider edge router that has been elected as the designated router for the second layer-3 IRB interface of the second layer-2 domain.

10. The first provider edge router of claim 9,
wherein the multicast receiver device is directly coupled to the first provider edge router by an attachment circuit of the plurality of attachment circuits, and
wherein forwarding the multicast packet to the multicast receiver device comprises forwarding, by the first provider edge router and using the attachment circuit, the multicast packet to the multicast receiver device.

11. The first provider edge router of claim 9, wherein the at least one module is operable by the at least one processor to:
configure the first layer-3 IRB interface at the first provider edge router to send and receive multicast traffic in the first layer-2 domain;
configure the second layer-3 IRB interface at the first provider edge router to send and receive multicast traffic in the second layer-2 domain;
determine the multicast receiver device is included in a customer network that is directly coupled to the first provider edge router by an attachment circuit; and
install at least one next hop in a forwarding unit of the first provider edge router that causes the multicast packet received by the second layer-3 IRB interface to be forwarded by the forwarding unit to the multicast receiver device using the attachment circuit.

12. The first provider edge router of claim 11, wherein the at least one forwarding unit is operable to:
snoop for multicast join messages that are received from multicast receivers in the second layer-2 domain; and
suppress forwarding of the multicast join messages to other provider edge routers included in the second layer-2 domain.

13. The first provider edge router of claim 9, wherein the first provider edge router is configured in a Virtual Local Area Network (VLAN) aware bundle service.

14. The first provider edge router of claim 9,
wherein the multicast receiver is a first multicast receiver device, wherein a second multicast receiver device is multi-homed in an Ethernet Virtual Private Network (EVPN) to the second provider edge router and a third provider edge router,
wherein the second provider edge router is the designated router in the EVPN for forwarding multicast traffic for the second layer-2 domain, and
wherein the multicast packet is forwarded by the second provider edge router to the multicast receiver device, without being forwarded by the third provider edge router.

15. The first provider edge router of claim 9,
wherein the first provider edge router is configured in an Ethernet Virtual Private Network (EVPN) with the second provider edge router and a third provider edge router, wherein the second provider edge router is the designated router on the first layer-3 IRB interface on the second layer-2 domain;
wherein the multicast receiver device is a first multicast receiver device attached to the first provider edge router, and wherein a second multicast receiver device is attached in the EVPN to the second provider edge router;
wherein the third provider edge router does not include an IRB interface, and the second provider edge router tunnels multicast traffic from the first provider edge router to the third provider edge router, without forwarding the multicast traffic back to the first provider edge router.

16. The first provider edge router of claim 9, wherein the first provider edge router is configured in an EVPN.

17. A non-transitory computer-readable storage medium encoded with instructions that, when executed, cause at least one processor of a first provider edge router to:
configure first and second layer-2 domains to forward network traffic;
configure a first layer-3 Integrated Routing and Bridging (IRB) interface for the first layer-2 domain and a second layer-3 IRB interface for the second layer 2 domain;
receive a multicast packet from a multicast source device, the multicast source device being included in the first layer-2 domain, the multicast packet having a multicast receiver device in the second layer-2 domain, wherein a second provider edge router is elected as a designated router for forwarding multicast traffic on the second layer-3 IRB interface of the second layer-2 domain, and wherein the first provider edge router is a non-designated router for the second IRB interface on the second layer-2 domain; and
forward, using the first and second layer-3 IRB interfaces, the multicast packet to the multicast receiver device, without receiving the multicast packet from the second provider edge router that has been elected as the designated router for the second layer-3 IRB interface of the second layer-2 domain.

18. The non-transitory computer-readable storage medium of claim 17,
wherein the multicast receiver device is directly coupled to the provider edge router by an attachment circuit of the plurality of attachment circuits, and
wherein forwarding the multicast packet to the multicast receiver device comprises forwarding, by the provider edge router and using the attachment circuit, the multicast packet to the multicast receiver device.

19. The non-transitory computer-readable storage medium of claim 17, further comprising instructions that, when executed, cause at least one processor to:

configure the first layer-3 IRB interface at the first provider edge router to send and receive multicast traffic in the first layer-2 domain;

configure the second layer-3 IRB interface at the first provider edge router to send and receive multicast traffic in the second layer-2 domain;

determine the multicast receiver device is included in a customer network that is directly coupled to the first provider edge router by an attachment circuit; and install at least one next hop in a forwarding unit of the first provider edge router that causes the multicast packet received by the second layer-3 IRB interface to be forwarded by the forwarding unit to the multicast receiver device using the attachment circuit.

20. The non-transitory computer-readable storage medium of claim 19, further comprising instructions that, when executed, cause at least one processor to:

snoop for multicast join messages that are received from multicast receivers in the second layer-2 domain; and suppress forwarding of the multicast join messages to other provider edge routers included in the second layer-2 domain.

\* \* \* \* \*